United States Patent
Antonyraj et al.

(10) Patent No.: US 10,666,642 B2
(45) Date of Patent: May 26, 2020

(54) SYSTEM AND METHOD FOR SERVICE ASSISTED MOBILE PAIRING OF PASSWORD-LESS COMPUTER LOGIN

(71) Applicant: CA, Inc., San Jose, CA (US)

(72) Inventors: Rosarin Jolly Antonyraj, Sunnyvale, CA (US); Shantanu Gattani, Fremont, CA (US); Mingliang Pei, Palo Alto, CA (US)

(73) Assignee: CA, Inc., San Jose, CA (US)

( * ) Notice: Subject to any disclaimer, the term of this patent is extended or adjusted under 35 U.S.C. 154(b) by 150 days.

(21) Appl. No.: 15/418,344

(22) Filed: Jan. 27, 2017

(65) Prior Publication Data

US 2017/0250974 A1   Aug. 31, 2017

Related U.S. Application Data

(60) Provisional application No. 62/300,472, filed on Feb. 26, 2016.

(51) Int. Cl.
*H04L 29/06* (2006.01)
*G06F 21/34* (2013.01)
*G09C 5/00* (2006.01)
*H04W 12/00* (2009.01)
(Continued)

(52) U.S. Cl.
CPC ............ *H04L 63/083* (2013.01); *G06F 21/34* (2013.01); *G09C 5/00* (2013.01); *H04L 9/0822* (2013.01);
(Continued)

(58) Field of Classification Search
CPC ......... H04L 63/083; H04L 63/08; H04L 1/66; H04L 29/06; H04L 9/32; H04L 9/08;
(Continued)

(56) References Cited

U.S. PATENT DOCUMENTS 8,103,247 B2 *   1/2012   Ananthanarayanan ..................... H04W 12/06 455/411
8,850,031 B2 *   9/2014   Oshiba ................ H04M 1/7253 709/227

(Continued)

FOREIGN PATENT DOCUMENTS

WO   2014193178 A1   12/2014

OTHER PUBLICATIONS

Bo Zhu, et al., Loxin—A solution to password-less universal login, Jul. 2014, 2014 IEEE Conference on Computer Communications Workshops (INFOCOM WKSHPS), pp. 1-6.*

(Continued)

*Primary Examiner* — Farid Homayounmehr
*Assistant Examiner* — Raied A Salman
(74) *Attorney, Agent, or Firm* — Maschoff Brennan

(57) ABSTRACT

A system and method for pairing a mobile device with a computer for password-less login using a network service is provided. The method may include sending a pairing request to a network server from a computing device, wherein the pairing request includes computer authentication data and a computer public key. The network server may pair the mobile device with the computing device; wherein, the computing device may generate a pairing secret key and an associated QR image, which the user is prompted to scan using the mobile device. A pairing agent within the mobile device may validate the computer authentication data and parse the computer public key therefrom. In some embodiments a PIN could be displayed by the computer and entered by the user into the mobile device or silently exchanged between the computer and the mobile device, when proximate to each other, for the mutual authentication data validation.

15 Claims, 10 Drawing Sheets

(51) Int. Cl.
   *H04L 9/08* (2006.01)
   *H04L 9/14* (2006.01)
   *H04L 9/32* (2006.01)
   *H04W 12/04* (2009.01)
   *H04W 12/06* (2009.01)

(52) U.S. Cl.
   CPC .............. *H04L 9/0894* (2013.01); *H04L 9/14* (2013.01); *H04L 9/3226* (2013.01); *H04L 9/3228* (2013.01); *H04L 9/3234* (2013.01); *H04L 63/0428* (2013.01); *H04L 63/061* (2013.01); *H04L 63/0838* (2013.01); *H04L 63/0853* (2013.01); *H04W 12/003* (2019.01); *H04W 12/04* (2013.01); *H04W 12/06* (2013.01); *H04L 63/0435* (2013.01); *H04L 2209/80* (2013.01); *H04L 2463/062* (2013.01); *H04W 12/00522* (2019.01)

(58) Field of Classification Search
   CPC .............. H04L 63/0428; H04L 63/061; H04L 63/0838; H04L 63/0853; H04L 9/0894; H04L 9/14; H04L 9/3226; H04L 9/3228; H04L 9/3234; H04L 2209/80; H04W 12/02; H04W 12/06; H04W 4/00; H04W 12/04; H04B 7/00; H04M 1/66; G06F 15/16; G06F 21/00; G06F 21/43; G06Q 20/38; H02J 7/025; H02J 7/027; H02J 13/002
   USPC ....... 713/171; 709/227; 726/10, 9; 455/41.2, 455/411
   See application file for complete search history.

(56) References Cited

U.S. PATENT DOCUMENTS

| | | | | |
|---|---|---|---|---|
| 9,197,414 | B1* | 11/2015 | Martin | H04L 9/14 |
| 9,378,356 | B2* | 6/2016 | Rockwell | G06F 21/43 |
| 9,634,999 | B1* | 4/2017 | Marion | G06F 21/6227 |
| 9,639,710 | B2* | 5/2017 | Cooley | H04L 63/0428 |
| 2003/0061350 | A1* | 3/2003 | Masuoka | H04L 63/0428 709/225 |
| 2009/0093215 | A1* | 4/2009 | Eisenbach | G06F 21/6218 455/41.2 |
| 2012/0227096 | A1* | 9/2012 | Edwards | H04L 9/0827 726/7 |
| 2012/0260349 | A1* | 10/2012 | Nagai | G06F 21/44 726/28 |
| 2012/0272055 | A1 | 10/2012 | Jung et al. | |
| 2014/0026204 | A1* | 1/2014 | Buntinx | H04L 63/062 726/9 |
| 2014/0101451 | A1* | 4/2014 | Chan | H04L 67/1097 713/171 |
| 2015/0026723 | A1 | 1/2015 | Yuriy et al. | |
| 2015/0249540 | A1 | 9/2015 | Khalil et al. | |
| 2015/0365400 | A1 | 12/2015 | Cox | |
| 2015/0372811 | A1* | 12/2015 | Le Saint | H04L 9/3228 705/76 |
| 2016/0034708 | A1* | 2/2016 | Shim | G06F 21/6245 713/186 |
| 2016/0103675 | A1* | 4/2016 | Aabye | G06F 8/65 717/170 |
| 2016/0127344 | A1* | 5/2016 | Cox | H04L 63/0823 726/7 |
| 2016/0212126 | A1* | 7/2016 | Sadacharam | H04L 63/0861 |
| 2017/0083716 | A1* | 3/2017 | Sun | H04L 9/0822 |
| 2017/0163074 | A1* | 6/2017 | Kimura | H02J 7/025 |
| 2017/0357819 | A1* | 12/2017 | Sherkin | G06F 21/6218 |

OTHER PUBLICATIONS

United States Patent and Trademark Office; International Preliminary Report on Patentability; issue in PCT Application No. PCT/US2017/019213; dated Sep. 7, 2018; 7 pages.

* cited by examiner

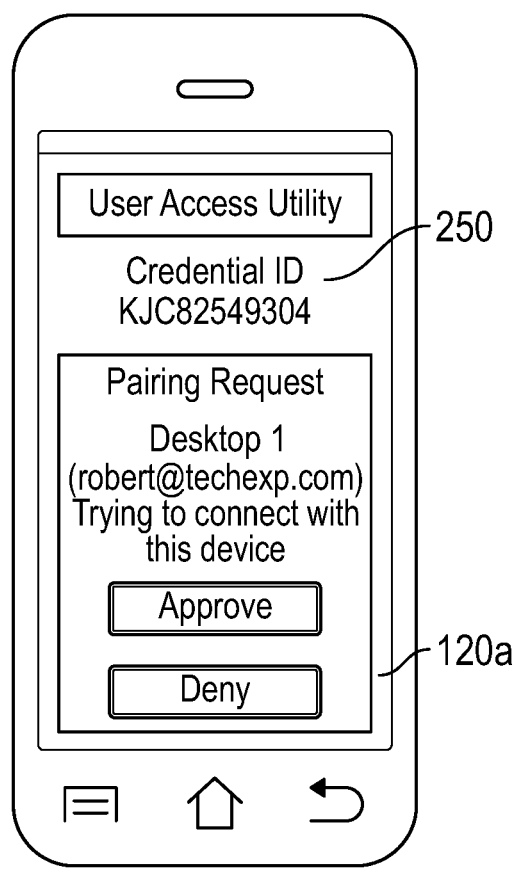
FIG. 2B
FIG. 2C

SYSTEM AND METHOD FOR SERVICE ASSISTED MOBILE PAIRING OF PASSWORD-LESS COMPUTER LOGIN

BACKGROUND

Given the proliferation of a variety of computer networking requirements with respect to passwords and user privileges, authentication of a user on a computing device using a password and username commonly poses a level of difficulty for most. For example, a user may have a variety of accounts on a variety of differing computing devices, all with different usernames and passwords that require a combination of alphanumeric and special characters. In particular, each account may require a password to possess a specific number of characters, including, numeric, alphabetic, and special characters. All of these passwords and usernames require the user to memorize and recall far too much data. Additionally, security issues may exist regarding the use of passwords during a login attempt when malicious code having keystroke tracking features is present on the machine. Some users may be enticed to download this malicious code which makes password-based authentication vulnerable to the preying eyes of hackers. Further, emailed phishing attempts that entice the user to reveal a username and password through a counterfeit marketing link may also expose the user's password and username to a hacker.

As a solution to password-based authentication, the capability of proximal detection of a mobile personal device associated with the user in a computer may render a password-less login feature to be more secure. In particular, a mobile device associated with a computer may be used as a natural authenticator, given the fact that a user is more likely to carry a mobile device during an attempt to login to a computer. That is, some computing environments may use the proximal detection feature to pair a mobile device with a computing device of the same user during user login. There have been attempts to facilitate a password-less computer login, where the user is enabled to approve the login attempt using an approval click in a user-registered mobile device, such as a phone or wearable devices. However, such solutions typically leverage proximal detection of mobile devices through the use of Bluetooth Low Energy (BLE). That is, some computing environments may be paired with a mobile device using the BLE protocol. However, in many computing environments, the BLE feature does not exist. Thereby, one current challenge is to support all computing devices and environments, such as Enterprise® deployment with mixed types of computer models, which do not have BLE detection capability. For example, a machine having version 7 of Windows® (which does not possess BLE detection) is presently a commonly used environment. Some vendors offer a BLE dongle for users to install to solve the problem. Yet, a BLE dongle makes the password-less login much more cumbersome, as it is just another expense of time and computing resources. It is within this context that the embodiments arise.

SUMMARY

Embodiments of a system and method for securely pairing a mobile device with a computing device for password-less login using a network service are provided. It should be appreciated that the present embodiment can be implemented in numerous ways, such as a process, an apparatus, a system, a device, or a method. Several inventive embodiments are described below.

In some embodiments, a system and method for data communication is provided. The method may include sending a pairing request to a network server from a computing device, wherein the pairing request includes computer authentication data and a computer public key. The method may further include a pairing, in response to the pairing request, a mobile device with the computing device using a network server. For example, during the pairing of the devices, the computing device may generate a pairing secret key and an associated QR image, which the user is prompted to scan using the mobile device. A pairing agent within the mobile device may read the computer authentication data and parse the computer public key therefrom. The pairing agent may also extract the pairing secret key from the scanned QR image to validate the pairing request and generate a password encryption key to be used to encrypt the user login password on the computing device. The method may implement asymmetric encryption, whereby the password encryption key may be stored on the mobile side, while the login password is stored as an encrypted version on the computer side. The password encryption key is sent to the computer side in encrypted form by the computer's public key. The computer can use the encryption key to encrypt login password at registration time or decrypt the encrypted password during login time.

In some embodiments, a data communication system is provided. The data communication system may include a computing device operable to send a pairing request to a network server from the computing device, wherein the pairing request includes computer authentication data and a computer public key. The network server may comprise a memory coupled a processor, the processor operable to pair, in response to the pairing request, a mobile device with the computing device. The mobile device may comprise a second processor operable to encrypt a password encryption key based upon the computer public key and transfer the encrypted password encryption key and mobile authentication data to the computing device. The computing device may be further operable to decrypt the encrypted password encryption key using the computer public key. Further, the computing device may be operable to encrypt a login password using the password encryption key and store this encrypted version of the login password; while deleting the password encryption key.

In some embodiments, a tangible, non-transitory, computer-readable media having instructions whereupon which, when executed by a processor, cause the processor to perform the data communication method described herein. The method may include sending a pairing request to a network server form a computing device, wherein the pairing request includes computer authentication data and a computer public key. The method may further include a pairing, in response to the pairing request, a mobile device with the computing device using a network server. At the mobile device, the method may include encrypting, by the mobile device, a password encryption key based upon the computer public key. This password encryption key may be transferred along with the mobile authentication data to the computing device, where the computing device authenticates the mobile authentication data. The method may further include decrypting, in response to the validated data, the encrypted password encryption key using the computer public key and encrypting a login password with the password encryption key. This encrypted login password may be stored, while the password encryption key is deleted.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

FIGS. 2A-1 and 2A-2 are example implementations of a data communication system for securely pairing a mobile device with a computer for password-less login using a network service, in accordance with some embodiments.

FIG. 2B is a diagram of an example graphical user interface (GUI) for the mobile side of the data communication system, used one or more of the mobile devices of FIG. 2A after receiving a pairing request in some embodiments.

FIG. 2C is another diagram of an example GUI for the mobile side of the data communication system, used one or more of wearable mobile devices of FIG. 2A for validating a pairing request in some embodiments.

DETAILED DESCRIPTION

Figure 1:
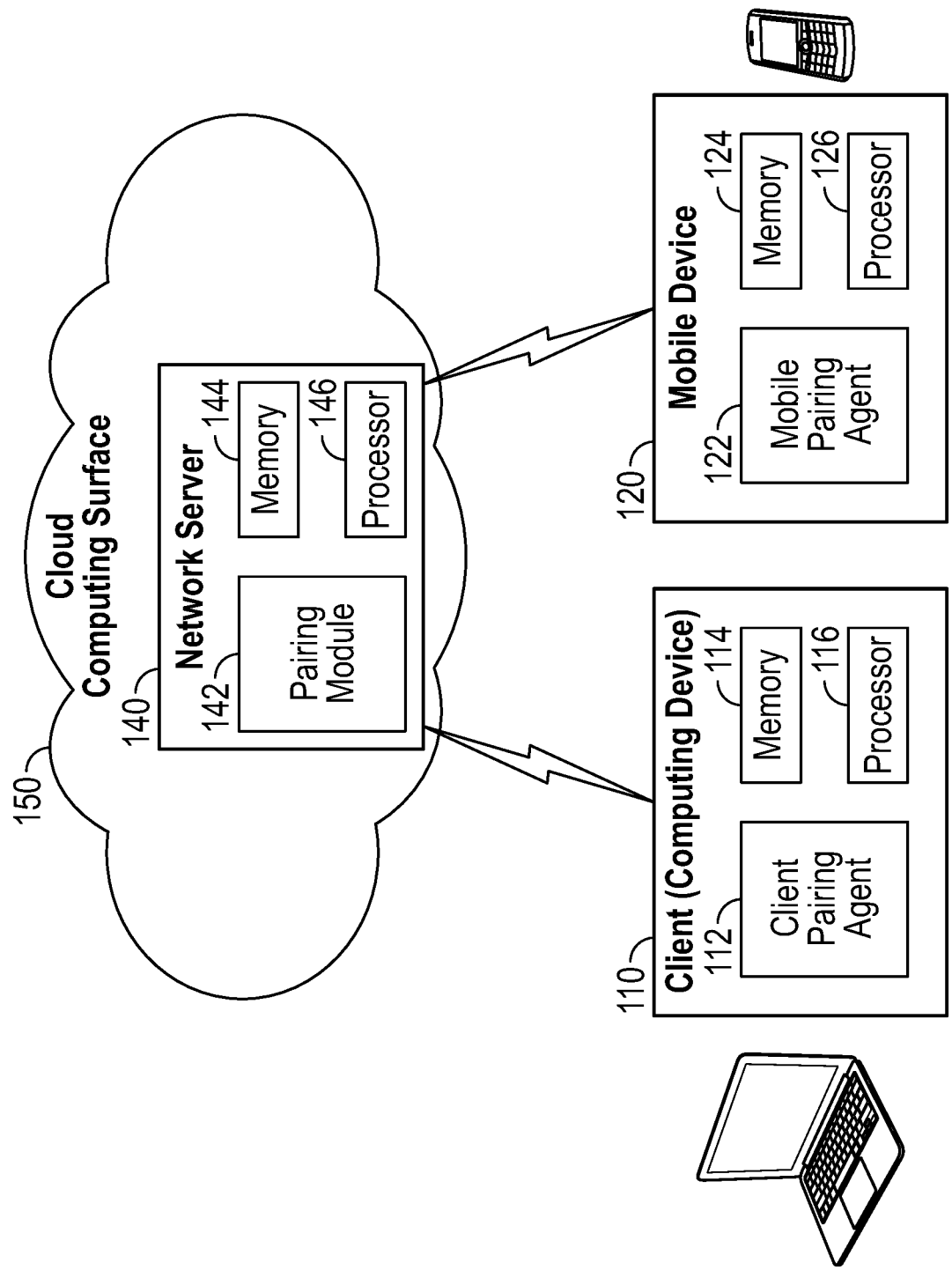
FIG. 1 is a perspective view of a data communication system for securely pairing a mobile device with a computer for password-less login using a network service, in accordance with some embodiments.

The following embodiments describe a data communication system and method for securely pairing a mobile device with a computer for password-less login using a network service. It can be appreciated by one skilled in the art, that the embodiments may be practiced without some or all of these specific details. In other instances, well known process operations have not been described in detail in order not to unnecessarily obscure the embodiments.

The system and method for data communication may include sending a pairing request to a network server from a computing device, wherein the pairing request includes computer authentication data and a computer public key. The method may further include pairing, in response to the pairing request, a mobile device with the computing device using a network server. For example, during the pairing of the devices, the computing device may generate a pairing secret key and an associated QR image, which the user is prompted to scan using the mobile device. A pairing agent within the mobile device may read the computer authentication data and parse the computer public key therefrom. The pairing agent may also extract the pairing secret key from the scanned QR image to validate the pairing request and generate a password encryption key to be used to encrypt the user login password on the computing device. The method may implement asymmetric encryption, whereby the login password (or the password encryption key) may be stored on the mobile side, while the login password is stored as an encrypted version on the computer side. Thereby, only the computer can decrypt the password because only the computer has the computer public key.

This system and method for data communication includes a revised computer login protocol through a paired mobile device that ensures end-to-end security such that a cloud computing service cannot impersonate any client. Further, the revised computer login protocol eliminates the need for a separate enterprise hosted gateway utility that protects the user login in pairing a computing and mobile device, and thereby, a need for a computer authentication credential to be sent from the computer device to cloud computing service. Rather the authentication scheme of this system and method for data communication, implements the use of a pairing PIN that is displayed on computer side and entered or scanned to the mobile side enables this feature. For example, in one embodiment, the pairing PIN can be a randomly generated numeric string with 6 to 10 digits. Further, the use of a long secret, or a computer public key directly embedded in a QR image may be used to enable this feature. The scanning of the QR image for local authentication and pairing promotes better usability, stronger security, and a user friendly application.

This system and method for data communication defines a protocol that establishes trust and secret exchange between any two client components through the network service, such as a cloud service, which is not limited to a particular credential provider. This system and method for data communication does not merely use a data object, such as a public key, to establish trust between the devices. Such a basic exchange could be subject to a "man-in-the-middle" attack due to a lack of authentication for the sending source. In particular, the data communication system may use a cloud service to assist in pairing a computing device and a mobile device. Data exchanged between the computing device and the mobile device may be exclusively known and stored on these devices; and not, the network server. Thereby, for purposes of heightened computer security, the network server is not able to encrypt messages, decrypt encrypted password keys or to discover data exchanged despite its participation in the pairing of the devices. This protects against a "man-in-the-middle" attack, whereby a third party is able to assume the role and authority of the network server or either of the two devices. The embodiments prevent an unauthorized from pairing a device with a computer or a computer with a mobile device. In particular, during the pairing phase, the network service may serve as a liaison in pairing the computing device with the mobile device in response to the pairing request.

In some embodiments, when the computing device and the mobile device are within a proximal range and have the ability to directly connect using a proximal detection protocol, such as Bluetooth Low Energy (BLE), the system and method uses the network server for the purpose of registration and central management. The network server, in this embodiment, does not function as an intermediary for pairing the devices. Rather, the network server registers both the computer and mobile device with a central network service for management purposes, such as tracking and monitoring service consumption. This enables the system administrator of the service provider to turn off pairing features in the case where, for example, a phone is lost or stolen. Meanwhile, the central network service is not able to impersonate any device. Further, the network server may be able to identify and track a computing device with a customer account without using special customer account credentials, such as an account certificate. Although this system and method for data communication may take advantage of the proximal detection feature of a computing and mobile device, the existence of the proximal detection feature is not required for a successful implementation of the system and method data communication disclosed herein. This makes the system described herein applicable to broader legacy computers for enterprise deployment.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, an exemplary embodiment of system and method for securely pairing a mobile device with a computing device for password-less login using a network service is shown. The system includes at least one client computing device 110, at least one mobile device 120, and at least one network server 140 within a network service computing environment 150. Both the computing device 110 and the mobile device 120 may couple to a network server 140. The computing device 110, network server 140, and the mobile device 120 may reside on the same LAN, or on different LANs that may be coupled together through the Internet, but separated by firewalls, routers, and/or other network devices. In one embodiment, computing device 110 may couple to network 150 through a mobile communication network. Similarly, the mobile device 120 may couple to network 150 through a mobile communication network. In another embodiment, the computing device 110, network server 140, and the mobile device 120 may reside on different networks.

Each computing device 110 may include a client pairing agent 112, memory 114 and a processor 116. Although not shown, each computing device 110 may include a monitor for displaying a QR image or a PIN associated with the computing device during a pairing phase of the computing device and the mobile device. For example, a local authentication process may be conducted through the use of a pairing PIN, a long secret, and/or a computer public key directly embedded in a QR image. Examples of the computing device 110 may include, but are not limited to, personal computers, laptops, PDAs, mobile phones, network appliances, and the like. The client pairing agent 110 may serve to generate pairing requests, including computer authentication data and a computer public key initiated by the user (discussed in further detail with reference to the method of pairing using the network server below). The client pairing agent 110 may also serve to communicate these requests indirectly to the mobile device 120 through the network server 140. Upon prompting through a mobile notification service, the client pairing agent 110 may also initiate the displaying of the QR image or the PIN associated with the computing device 110 during the pairing phase. Further, the client pairing agent 110 may couple with memory 114 and the processor 116 to decrypt the password encryption key generated by the mobile device 120, sent in response to the pairing request (further detail provided in the method of pairing given below). The client-pairing agent 100 may also use alternative channels to the QR code to transmit a pairing PIN to a mobile device in proximity, for example, use of BLE is one alternative if the computing device has such capability.

In some embodiments, the mobile device 120 may include a mobile pairing agent 122, a memory 124 and processor 126. The mobile pairing agent 122 may serve to indirectly communicate pairing approval with computing device 110 through network server 140. The mobile pairing agent 122 may generate and encrypt a password encryption key based upon the public key of the computer requesting to be paired with the mobile device. The agent 122 is also capable of scanning a QR code or receiving a BLE message that Client Pairing Agent 112 has sent in some embodiments. Although not shown, in various embodiments, the mobile device 120 may be a network appliance, mobile telephone, smart telephone, pager, radio frequency (RF) device, infrared (IR) device, Personal Digital Assistant (PDA), set-top box, camera, integrated device combining at least two of the preceding devices, and the like.

In one embodiment, the network server 140 may include a pairing module 142, a memory 144, and processor 146. In one embodiment, the data communication system 100 may use a cloud service to assist in pairing the computing device 110 and the mobile device 120. Data exchanged between the computing device and the mobile device may be exclusively known and stored on the devices (110, 120) and not the network server 140. Thereby, the network server 140 is not able to decrypt encrypted password keys or to discover data exchanged despite its participation in the pairing of the devices (110, 120). In particular, during the pairing phase, the pairing module 142 may serve as the liaison in pairing the computing device 110 with the mobile device 120 in response to the pairing request. For example, when the computing device 110 sends a pairing request, the pairing module 142 may send a mobile push notification to the mobile device 120 indicating that a pairing request has been initiated and solicit a response from the user at the mobile device 120. The pairing module 142 may also register the mobile device 120 when the mobile pairing agent is installed, such that the network server 140 can detect whether the mobile device is registered prior to allowing a pairing request to be completed. That is, in some embodiments, without registration of the mobile device 120, the pairing module 142 can deny a pairing request sent by the computing device 110. With registration, the network service may be able to initiate contact with the mobile device 120 to verify data sent by the mobile device using an existing mobile credential, such as a credential identifier, a user identifier and a one-time-password or a proof of possession signature, and the like. Thus, the pairing module 142 is enabled to track the usage of the pairing service. Further, the pairing module 142 may solicit a response from a detected Enterprise® entity provider for an Enterprise® service use entitlement such that the pairing module 142 can authenticate a pairing request based upon validation form an entity provider and track the usage of the same. In the alternative, the pairing module 142 may solicit a response from the mobile device using SMS, voice call, or the like. In this embodiment, the user may choose to enter the PIN displayed on the monitor of the computing device or may scan the QR image displayed on the same. In another embodiment the computing device 110 may generate a pairing secret key and associate the key with the QR image, for display on a monitor associated with computing device 110. In yet another embodiment, the computing device 110 may use BLE to silently transmit a pairing secret key via BLE to the mobile device if the computing device has BLE capability.

The network service computing environment 150 may comprise, for example, the server computer 140 or any other system providing computing capability. Alternatively, the network service computing environment 150 may employ a plurality of computing devices that are arranged, for example, in one or more server banks or computer banks or other arrangements. Such computing devices may be located in a single installation or may be distributed among many different geographical locations. For example, the network service computing environment 150 may include a plurality of computing devices that together may comprise a cloud computing resource, a grid computing resource, and/or any other distributed computing arrangement. In some cases, the network service computing environment 150 may correspond to an elastic computing resource where the allotted capacity of processing, network, storage, or other computing-related resources may vary over time.

In one embodiment, after the mobile device 120 and the computing device 110 are paired, the pairing module 142 may also assist in responding to a password-less login request by asserting a mobile push notification to the mobile device 120. During this password-less login, the mobile pairing agent 122 may extract the computer public key from the requesting computing device 110 and, in response, detect whether a pairing exists between the mobile device and computing device. The mobile pairing agent may further encrypt and send a password encryption key to the client computing device 110, which can decrypt the password encryption key. This password encryption key may be used to encrypt and decrypt the user login password. During a password-less login, the client pairing agent may be enabled to decrypt the encrypted user login password previously stored during the pairing stage of the mobile device 120 and computing device 110.

Figures 1, 2A:
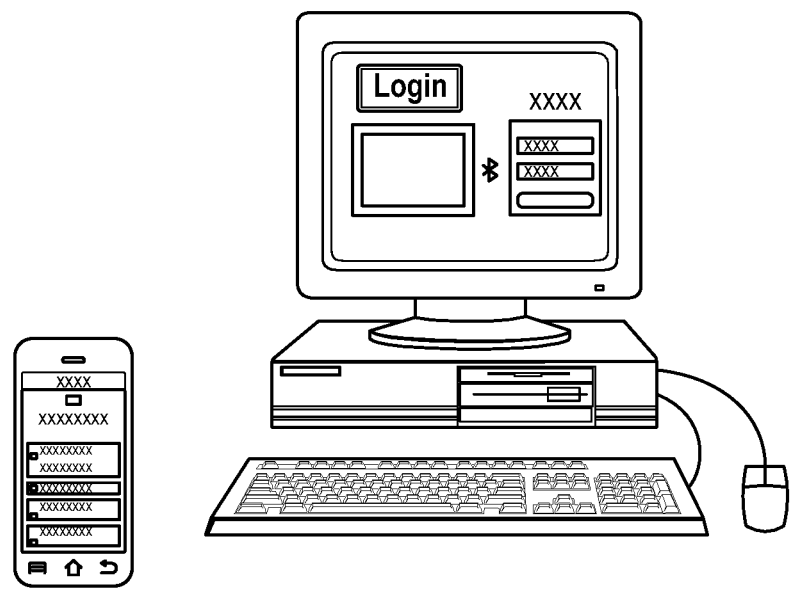
Figures 2, 2A:
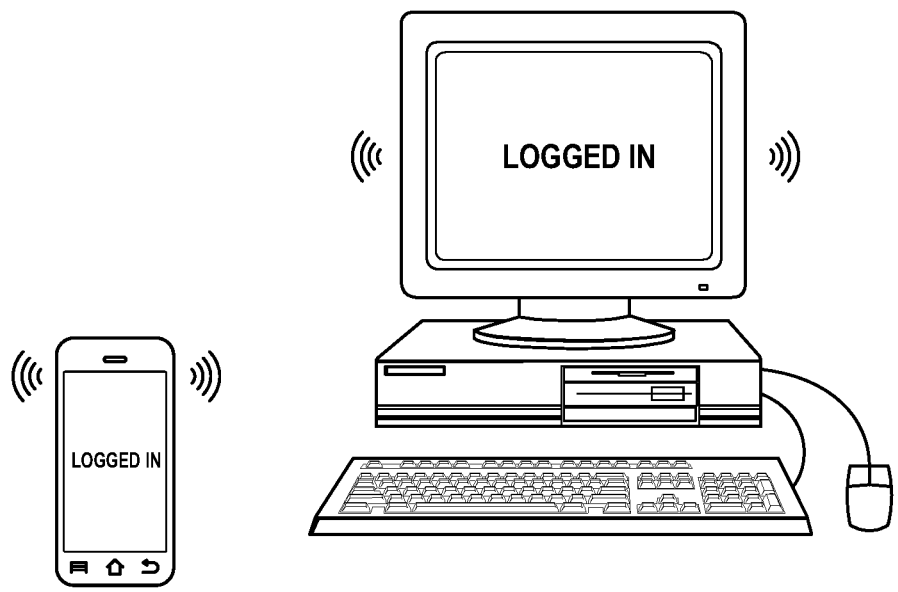

FIGS. 2A-1 and 2A-2 are example implementations of a data communication system for securely pairing a mobile device with a computer for password-less login using a network service, in accordance with some embodiments. As shown in FIG. 2A-1, a QR image is displayed on the computing device monitor in response to a pairing request. After the mobile device scans the QR image, the user is logged into the computing device in accordance with the pairing protocol and login protocol after pairing (to be described in detail with reference to FIGS. 4-6A). In FIG. 2A-2 a PIN (personal identification number) could be displayed by the computer and entered by the user into the mobile device for the mutual authentication data validation as described further below. FIG. 2B shows a diagram of an example graphical user interface (GUI) for the mobile side of the data communication system, used for one or more of the mobile devices 120 of FIGS. 1, 2A-1 and 2A-2, after receiving a pairing request in some embodiments. The cloud service 150 can assert a mobile notification push to the mobile device 120a as shown (in FIG. 2B), comprising notice of the computing device, an associated user credential (such as an email address), and credential identifier. The user of the mobile device 120a may choose whether to approve or deny the pairing request by selecting a button, as shown. FIG. 2C is another diagram of an example GUI for the mobile side of the data communication system, used one or more of wearable mobile devices 120b of FIG. 2A for validating a pairing request in some embodiments. The user wearing the wrist watch, mobile device 120b may confirm a pairing request by touching the touch sensitive user screen. For example, a swiping up of one finger may represent approve, while the swiping down of one finger may represent deny. The mobile device 120 may be configured to sense a variety of hand gestures made in response to the mobile push notification, including the detection of the number of fingers making the gesture and the direction of the swipe, tap, or shape made by the finger.

Figure 3A:
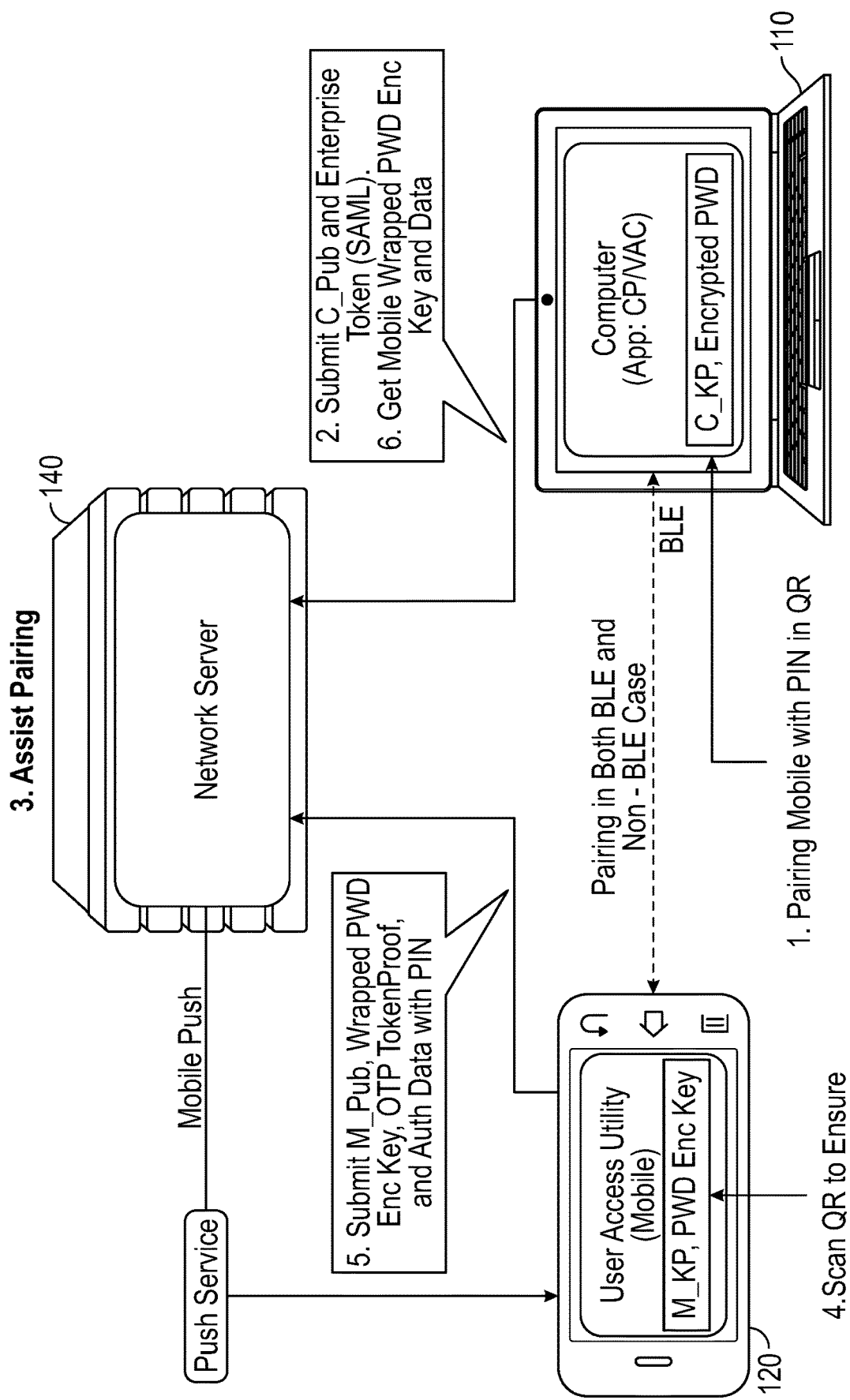
FIG. 3A illustrates communication and/or operation architectures for a password-less computer login in accordance with some embodiments.

FIG. 3A illustrates communication and/or operation architectures for a password-less computer login in accordance with some embodiments. As shown, the computing device 110 is paired with the mobile device 120 through the cloud service executed by network server 140 having a push service feature. The push service may be external to the cloud service or internally located within the network server 140. As a first action, pairing of the mobile device with the computing device may occur through a proximal detection service, such as BLE or through the cloud assisted service indirectly. Secondly, the computing device may submit a public key and optionally an enterprise token, such as for example, a Security Assertions Markup Language (SAML) token that carry statements about the user, which are sets of claims made by one entity about another entity. Further, the cloud service assisted pairing may occur, where the public key and the token are used to validate the pairing request and prompt the mobile device through the mobile push service, as shown. Next, the computer device may display a PIN, a long secret, and/or a computer public key directly embedded in a QR image. In response, the user of the mobile device may enter the PIN and/or long secret. In the alternative, the user of the mobile device may choose to scan the QR image. In another alternative, the computer generated long secret is not displayed and is silently transmitted to a BLE pair device in close proximity if such a capability exists between the two devices. Further the mobile device may generate a mobile public key (M_pub) and a password encryption key. The mobile device may encrypt the password encryption key and send this encrypted key to the cloud service executed by network server 140, along with an One-Time Password (OTP) token proof and authentication data generated from the pairing PIN or secret that was locally transmitted between the two devices. Finally, the computing device may retrieve the wrapped (encrypted) password encryption key along with mobile device's public key. As shown the mobile device key pair (M_KP) and the password encryption key remain stored on the mobile device, while the computer exchange key pair (C_KP) and the encrypted password remains stored in the computing device. In this way, the key pairs may be used for secure end-to-end data exchange. Each side holds the other side's public key after the initial provisioning exchange. When one side needs to send data to other side in future, it will use the other side's public key to encrypt data. In this manner, only the intended target side can decrypt the received data. Accordingly, the mobile key pair (M_KP) and the computer key pair (C_KP) may be used for a future secure data exchange. For example, the exchange key pairs can be used for future billing and management purposes in some embodiments.

Figure 3B:
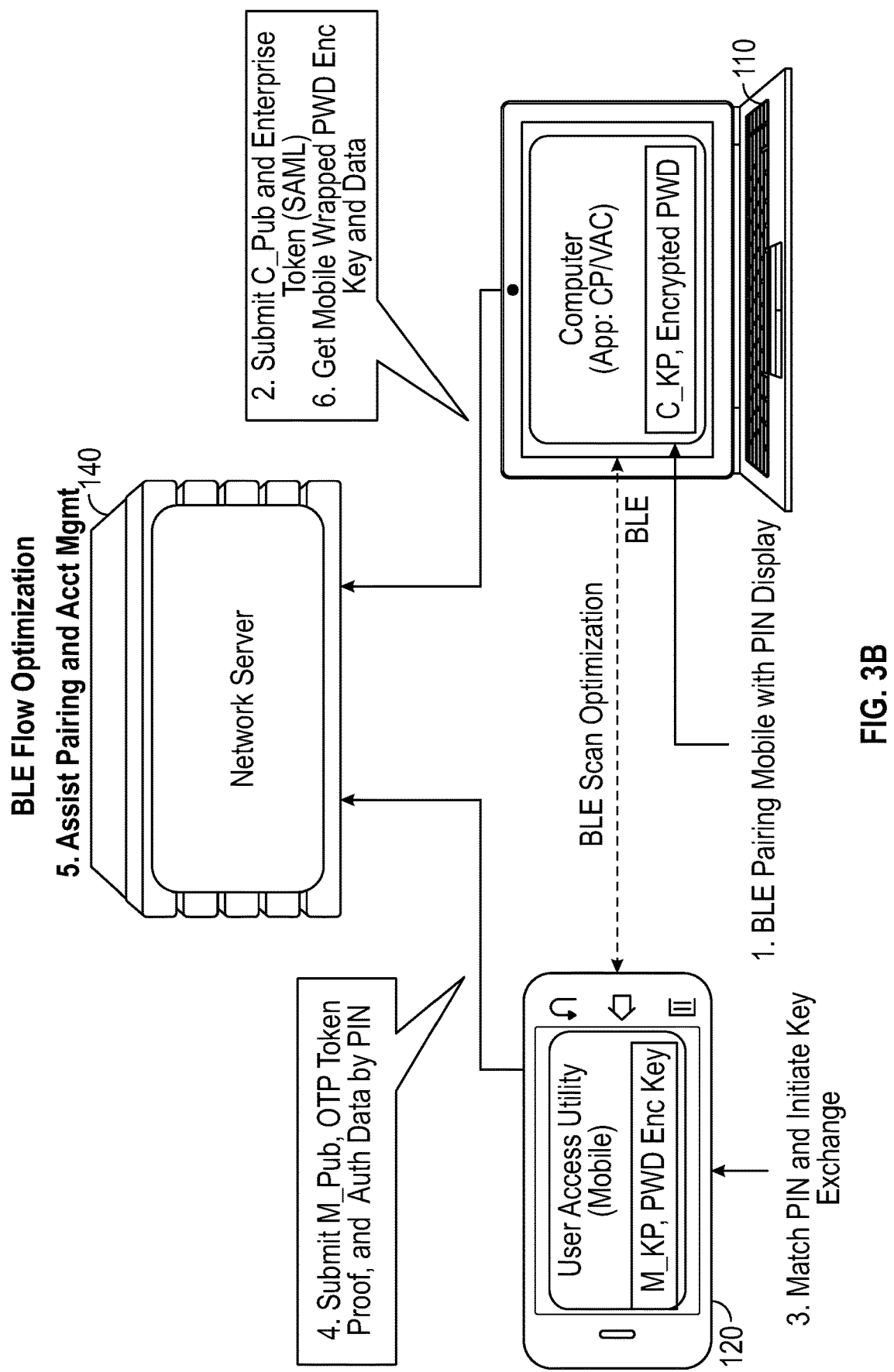
FIG. 3B illustrates communication and/or operation architectures for a password-less computer login having BLE flow optimization in accordance with some embodiments.

FIG. 3B illustrates communication and/or operation architectures for a password-less computer login having BLE flow optimization in accordance with some embodiments. In some embodiments, when the computing device 110 and the mobile device 120 have a proximal detection, such as BLE, the system and method for data communication may be used to enhance the pairing of the devices and security utility. As a first action, pairing of the mobile device with the computing device may occur through a proximal detection service, such as BLE. Secondly, the computing device may submit a public key and Enterprise token, such as for example, a Security Assertions Markup Language (SAML) token that carry statements, which are sets of claims made by one entity about another entity. Further, the computer device may optionally display a PIN while silently transmitting the PIN via BLE to the mobile device 120 for visual confirmation. In response, the user of the mobile device may optionally approve the PIN upon visual match check and initiate a key exchange with the mobile exchange key pair (M_KP) and the computer exchange key pair (C_KP). The mobile device may encrypt the password encryption key (wrapped key) with the computer's public key and send this encrypted key to the cloud service, optionally along with a One-Time Password (OTP) from a previously registered mobile credential with the service and authentication data generated with the PIN. In response, the cloud service may perform an assist to the pairing and account management, where the tracking of each mobile and computing device along with the monitoring of service consumption occurs. Finally, the computing device may retrieve the wrapped (encrypted) password encryption key along with mobile authentication data as well as the mobile device's public key.

Figure 4:
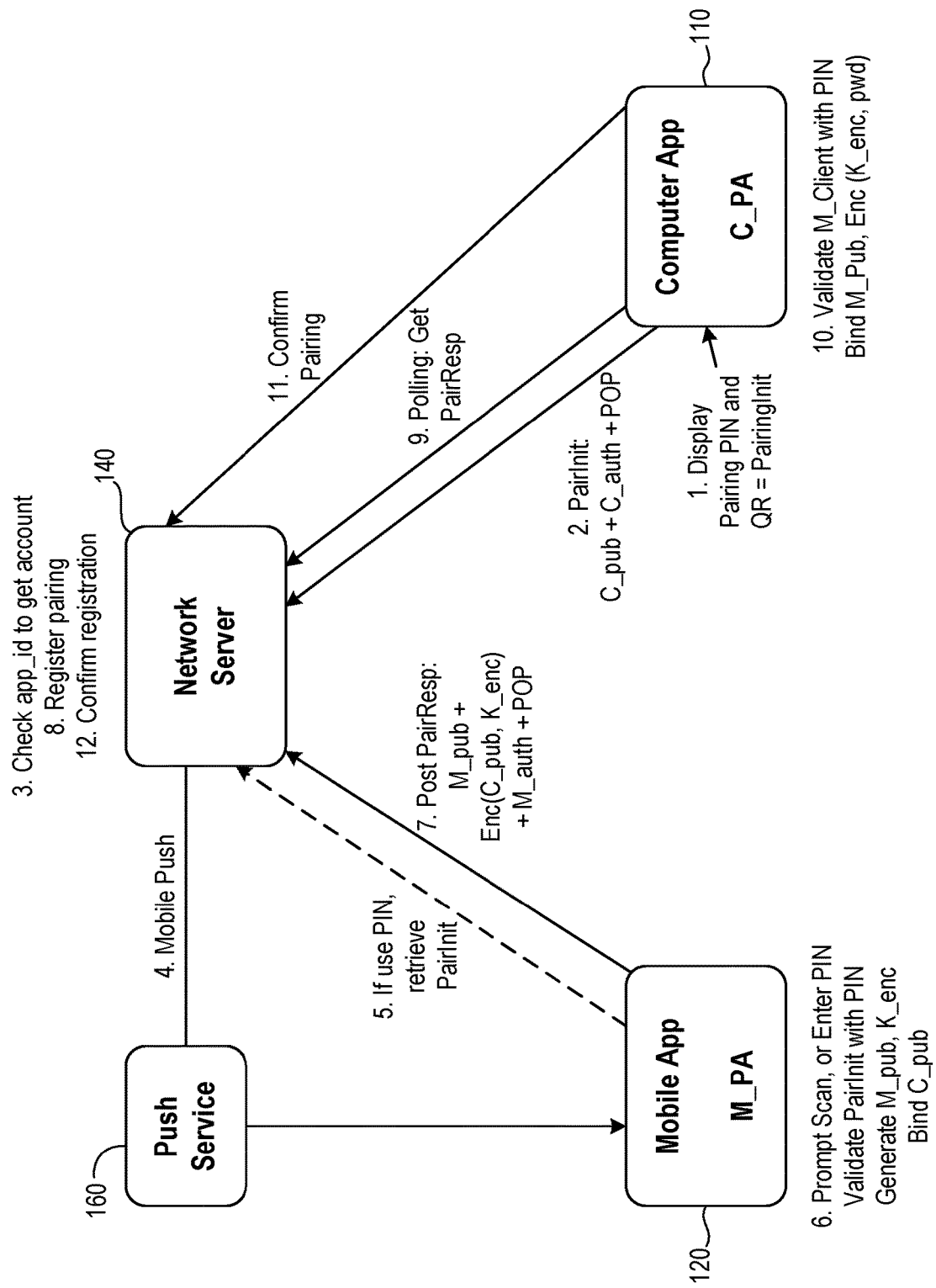
FIG. 4 is a block diagram showing a pairing protocol for the data communication system in accordance with some embodiments.

FIG. 4 is a block diagram showing a pairing protocol for the data communication system in accordance with some embodiments. The data communication system 100 may include a pairing computer application (C_PA) stored within in the computing device 110 (in memory 114) and executed by the processor 116 as shown in FIG. 1. Further, the system 100 may include a pairing mobile application (M_PA) stored within the mobile device 120 (in memory 124) and executed by the processor 126 as shown in FIG. 1. The mobile device 120 may comprise a device for pairing communication and/or QR reading capability. The system 100 may further comprise a cloud service to facilitate communication between a mobile device and a computer; and a mobile push service that sends notification to user's mobile devices on behalf of the cloud service.

The secure pairing and password exchange flow may include generating pairing and data exchange keys using the computing device 110. For example, the computer pairing application C_PA may generate a local one-time use pairing secret (C_LPS) and a persistent data exchange key pair C_KP. The pairing secret C_LPS may be displayed as a QR code in the computing device screen during the initiation of the pairing request (step 1 of protocol, as shown). Optionally, an explicit secret value that is a mobile keyboard friendly PIN may be displayed by the computing device. The QR image may also contain user information such as a username. Additionally, the QR image may include the public key value of C_PA, yet, this may make the too dense to recognize. Therefore, a preferred rendering for the QR image is one of a short QR friendly pairing key.

Secondly, the computing device 110 may request pairing. For example, the pairing computer application (C_PA) may send a pairing request to the cloud service, instructing it to notify a user registered mobile device using a Mobile Push. In one embodiment, the request may include not only the proof of possession (POP) of its private key, but also computer authentication data (C_AuthData) derived from the pairing secret over the client's public key (C_Pub) (step 2 of protocol, as shown). For example, the computing device may use a hashing algorithm function, such as the keyed-hash messaging authentication code (HMAC), to generate the computer authentication data:

$$C\_AuthData=HMAC(KDF(C\_LPS),ContextData|C\_Pub) \quad [1]$$

$$ContextData=Username|C\_KeyID \quad [2]$$

where, KDF is a key derivation function that derives one or more secret keys from a secret values such as a master key, a password, or a passphrase using a pseudo-random function. In one embodiment, the secret key may be derived from the C_LPS. The context data (ContextData) may be the username or a computer key identifier (C_KeyID). Using this format, the recipient of the data (whether the network server or the mobile device) is able to verify whether the data is from the original source and, thereby, any change implemented by a "man-in-the-middle" can be detected.

Optionally, this request may also include an Enterprise® association feature. In one embodiment, the request may include Enterprise® association data that provides proof to the cloud service of the computing device's Enterprise® service use entitlement. A delegated identity provider for an Enterprise® environment can validate the computing device and associated user using its login username and password or other authentication methods during this process. In response to a verified user, the delegated identity provider can send its authorization assertion (e.g. SAML) to the cloud service as a proof of an authenticated user.

Next, the cloud pairing service may verify the mobile device registration and in response to a validated registration, trigger the mobile application to run. In one embodiment, the cloud service may search for the requested mobile device to be paired in a database of registered mobile devices (step 3 of protocol, as shown). When a match occurs, the cloud pairing service may initiate the action for a push service to send a mobile push notification with a transaction ID to the user mobile device (step 4 of protocol, as shown). In some embodiments, the original pairing request message may not be included within the push notification due to the file size requirements and privacy consideration.

Further, the processing of the mobile pairing security occurs. The user can optionally enter the explicit PIN that is displayed on the monitor of the computing device or scan the QR image, as a fallback where QR capability is limited. In the case where the user opts to enter a PIN, the pairing mobile application (M_PA) may read computer authentication data from the initial pairing request payload located on the cloud pairing service (steps 5 and 6 of the protocol, as shown). In the alternative, the user may be prompted by the pairing mobile application (M_PA) to scan and read the QR code image displayed on the monitor of the computing device (step 6 of the protocol, as shown). In other cases where BLE capability is available, the mobile device may receive the pairing secret (C_LPS) silently via BLE channel without using a QR scan. The mobile application validates the pairing request, and stores the computing device's public key (C_Pub).

After the PIN entry or QR image scan or BLE based acquisition of C_LPS, the mobile password encryption key exchange may occur. In one embodiment, the pairing mobile application (M_PA) may generate its own data exchange key pair (M_KP) and a password encryption key K_PWD. The application (M_PA) may encrypt the password encryption key K_PWD using the requesting computer's public key C_Pub along with its authentication data. Further, this encrypted key K_PWD (or K_enc) may be sent by pairing mobile application (M_PA) to the cloud pairing service (step 7 of the protocol, as shown). In some embodiments, mobile application may send the proof of possession (POP) and mobile authentication data derived using a hashing algorithm function (HMAC) with the locally received C_LPS in proximity, similar to the one used to generate the computer authentication data. This data exchange may also include a mobile public key (M_pub) and a paired mobile device key identifier (M_KID). For example, the pairing mobile application (M_PA) may use the HMAC algorithm to generate the mobile authentication data:

$$\text{CipherData}=\text{Encrypt}(K\_PWD, C\_Pub) \quad [3]$$

$$M\_POP=\text{Signed}(\text{CipherData}, M\_Priv) \quad [4]$$

$$M\_AuthData=\text{HMAC}(\text{KDF}(C\_LPS), M\_KID|username|\text{CipherData}|POP) \quad [5]$$

where, deciphering data (CipherData) is an encrypted version of the password encryption key K_PWD based upon the requesting computer's public key C_Pub. The signed function of the deciphering data (CipherData) and a mobile private key (M_Priv) may be used to generate the proof of possession (M_POP). Further, the mobile authentication data (M_AuthData) may be generated using the keyed hashing function, HMAC, which hashes the secret key, the paired mobile device key identifier (M_KID), the username, the deciphering data (CipherData), and the proof of possession (M_POP). Similar to above, the secret key may be derived from a key derivation function using the C_LPS that are known to the computer device.

In completing the pairing of the computer device with the mobile device, the cloud pairing service may register the devices along with storing many of the pairing variables for each (step 8 of the protocol, as shown). At this point, the computing device may validate the response data received from the cloud service relating to the mobile device (step 10 of the protocol, as shown). For example, the mobile device may be validated using the C_LPS, the computer's private pairing secret. Therein, the pairing computer application (C_PA) can validate that the data is sent from the mobile device with the pairing secret based authentication data. At this point, the computing device can store the paired mobile device key identifier (M_KID), the mobile public key (M_Pub), and use the password encryption key (K_PWD) to encrypt its computer login password. The pairing computer application (C_PA) may store the encrypted password, and throw away the encryption key after the encryption. Further, the pairing and registration may be confirmed between the computing device and the cloud service (steps 11 and 12 of protocol, as shown).

After the pairing of the computer device with the mobile device, a password-less computer login may include a request from the computer application (C_PA) to the cloud service to perform a mobile push to the mobile device for retrieval of the password encryption key. The request may include the computer's data exchange key identifier and the proof of possession (POP) of its private key. In response, the mobile application (M_PA) may solicit user acknowledgement to approve the login request. After validation that the requestor has been previously paired with the mobile device, the mobile application (M_PA) may also send the password encryption key (K_PWD) in encrypted form using the requestor's public key (C_Pub). A previously paired computing device will be able to decrypt the encrypted password encryption key (K_PWD), get the user's password and use the standard login utility to login to the account.

In some embodiments, when the computing device application C_PA sends the pairing request message to the cloud pairing service, an authentication credential does not have to be used. This may also be an anonymous request to the network service.

In one embodiment, the QR image may be used to transport the computer public key (C_pub) to M_PA without going through the network service to solve "man-in-the-middle" scenario. When QR image is used, the mobile application M_PA will not need to make a trip to retrieve pairing request sent by the computing device. However, the QR data may be too dense which can lead to more time to scan the QR code.

In some embodiments, when a user has had multiple mobile devices, mobile push broadcasts to all related push enabled devices may be implemented. The push broadcast may include only the pairing request identifier in some embodiments. The actual request message does not need to be directly sent during the push broadcast. This may allow a larger size of request data; however, a mobile push broadcast may require a greater amount of time.

In some embodiments, it is possible to use a one-time-password or other previously known credential with the cloud service in the request from the computer application C_PA in an effort to mitigate spam to the network service.

During the mobile device response to the pairing request, the mobile application M_PA can be triggered to retrieve and respond the pairing request message. If the user chooses to enter PIN, mobile application M_PA calls the cloud service to retrieve the actual message. Mobile application M_PA may also send the request transaction ID from the push message. Further, mobile application M_PA may send authentication data to the cloud service using its mobile push credential. Thereby, the mobile application M_PA receives the pairing request data from the cloud service. If the user chooses to scan QR code, mobile application M_PA extracts the C_LPS and optionally C_Pub from the QR image.

In this example, after the pairing request for the given data is validated based upon the C_LPS, a key pair from the mobile device side may be generated including the mobile public key M_Pub, the mobile private key M_Priv, and a device identifier (M_ID). The mobile pairing application may generate a random data encryption key M_DK and store the computer identifier (C_ID), the public key (C_Pub), the user identifier (userid), the device identifier (M_ID), the mobile public key (M_Pub), the mobile private key (M_Priv), and the data encryption key (M_DK). The mobile pairing application may, in response, construct message back to the cloud network service for computing device polling. In particular, the mobile pairing application M_PA may send a pairing response message (pairingResp) to the cloud service, where the mobile push credential is used for the authentication to the service.

During the processing of the pairing response (pairingResp), the cloud service may authenticate the mobile device using the mobile credential. The cloud service may register the pairing identifier (C_ID, M_ID, username, enterprise ID) and store the data from the response message. The cloud service may respond to the computing devices' polling request to get the pairing response by sending the message "pairingResp." A polling request may be accepted when the C_ID and transaction ID matches what the cloud service stores for the. This check is optional for added security.

During the processing of the pairing response, the computing device validates the authentication data with a derived key with the same key derivation algorithm from C_LPS, and the mobile authentication data M_POP. The computing device may decrypt CipherData to get the data key "M_DK" with its private key C_Priv. Additionally, the computing device may store the following in a secure manner for future usage: Mobile device identifier (M_ID) and the mobile device's public key M_Pub. At this point, the two devices (computing device C_PA and mobile device M_PA) have exchanged and established a mutual trust with capability to do end-to-end secure data exchange.

The established pairing can be used to assist for password-less computer login. In this use case, the computing device may further use the encryption key M_DK to encrypt the password. The password encryption key M_DK does not get stored for security purposes.

In some embodiments, the computer device sends a confirmation message back to the cloud service and optionally the mobile device to acknowledge the pairing. At the same time, this confirmation may be used for future billing and management purposes, where the computing device is confirmed as a legitimate device that is registered.

When the cloud pairing Service registers a computing device for the future validation communication, the network service may perform the validation of the message and register the pairing in the service database between the computer and the mobile device identifiers C_ID and M_ID.

Figure 5:
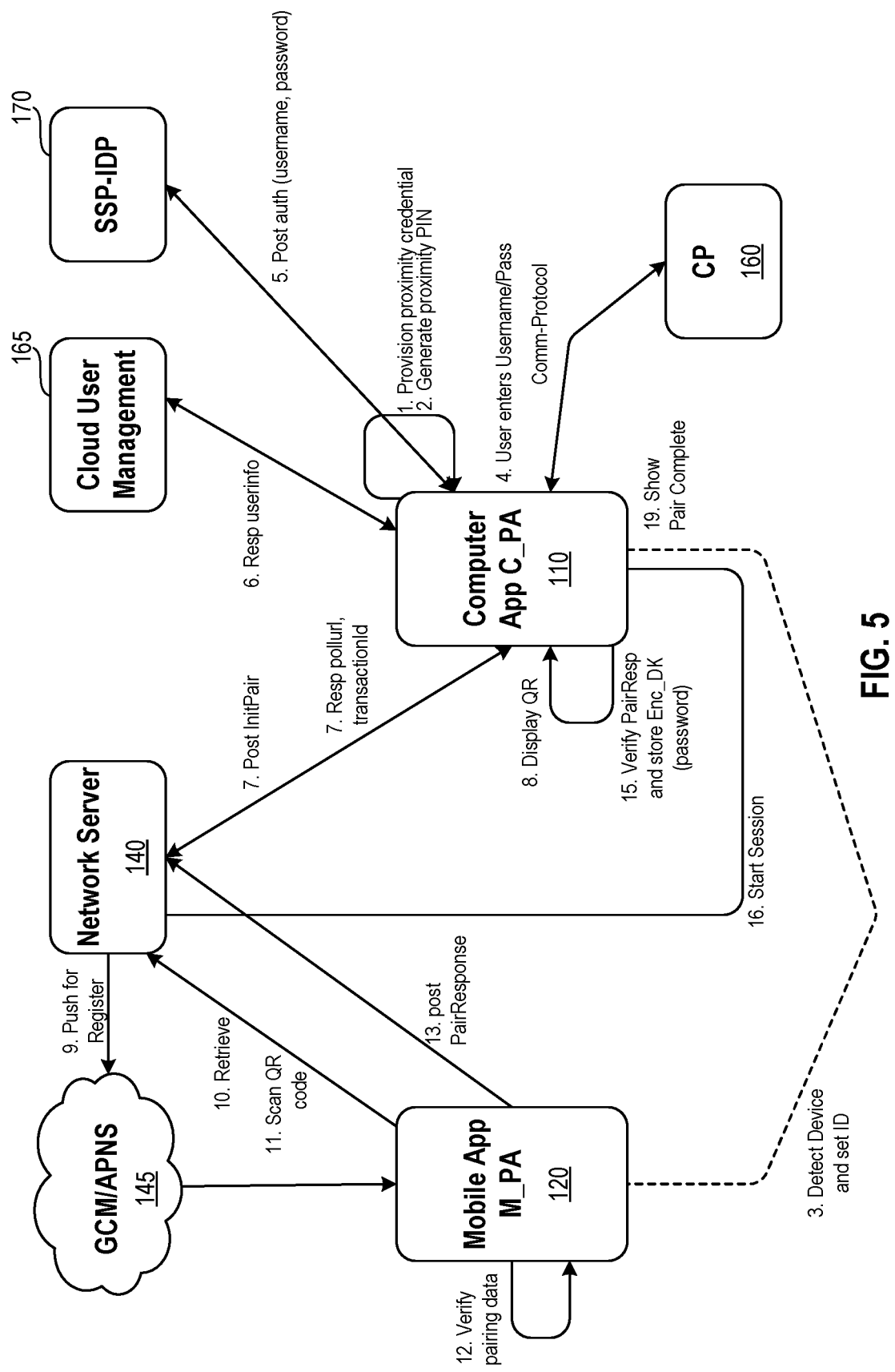
FIG. 5 is a block diagram showing a second pairing protocol for the data communication system in accordance with some embodiments.

FIG. 5 is a block diagram showing a second pairing protocol for the data communication system in accordance with some embodiments where enterprise user identities are registered at cloud for pairing management by enterprise administrators. Similar to the protocol of FIG. 4, the computing device C_PA may be paired with a mobile device M_PA using the cloud service executed by network server 140. The distinction between the protocol of FIGS. 4 and 5 is that the second pairing protocol includes a step of acquiring an enterprise user identity assertion to the cloud service, thereby allowing the cloud service to bind the user with the devices for enterprise management.

Figure 6A:
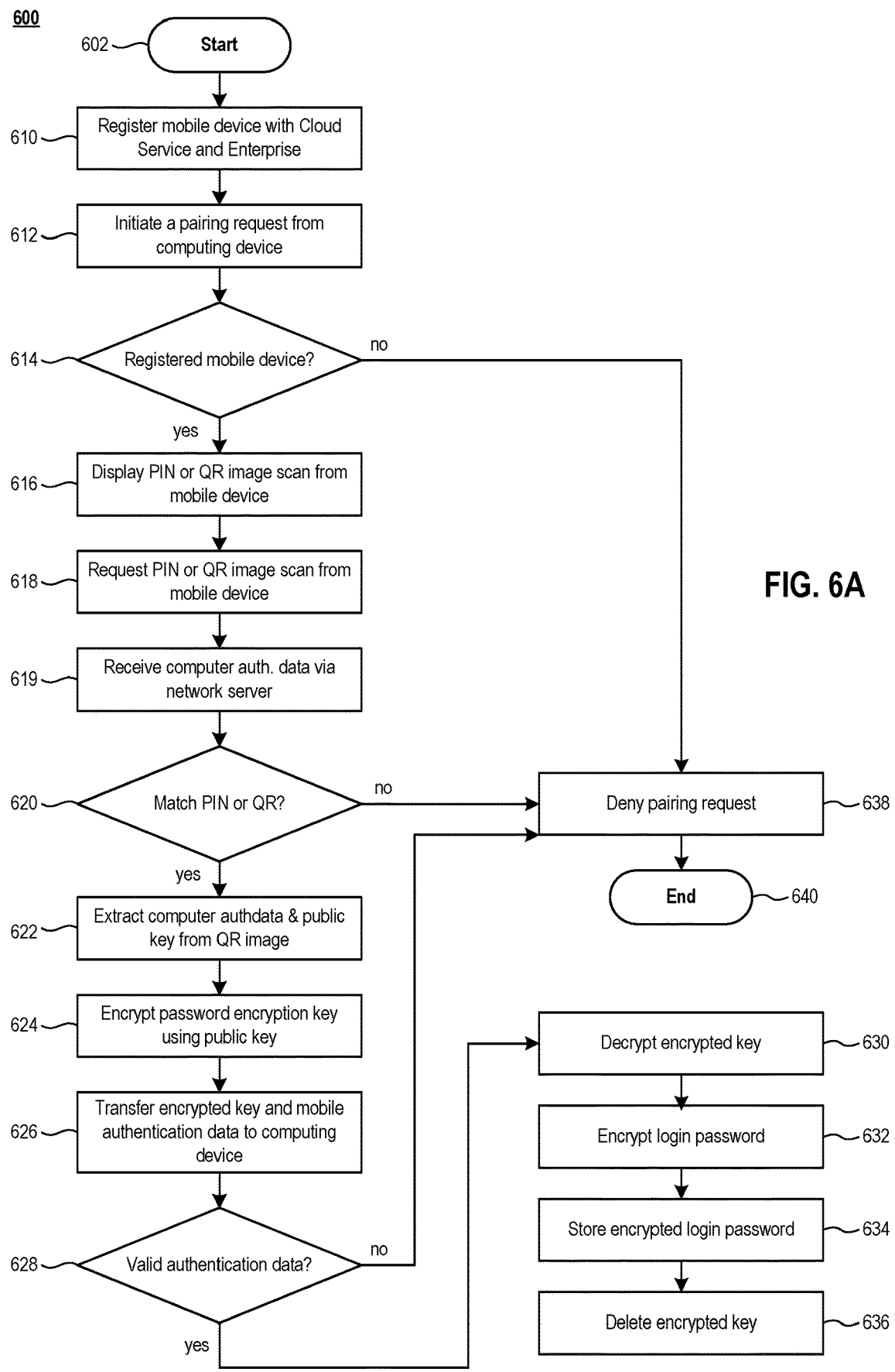
FIG. 6A is a flow diagram of a method for securely pairing a mobile device with a computer for password-less login using a network service in accordance with some embodiments.

FIG. 6A is a flow diagram of a method 600 for securely pairing a mobile device with a computer for password-less login using a network service in accordance with some embodiments. In an action 610, the mobile device is registered with the cloud pairing service. In addition, the mobile device may be registered with an Enterprise service provider. For example, the mobile device may be registered with the network server, wherein mobile credential data may be generated, including a user identifier and a phone number associated with the mobile device. At a later point, the initial mobile push notification may be based upon a mobile OTP credential for additional security.

In an action 612, the computing device may initiate a pairing request by sending the request to the network server. The pairing request may contain the computing device's authentication data, computer public key and proof of possession key. The computer device may also generate pairing and data exchange keys. For example, the computer pairing application C_PA within the computing device may generate a local one-time use pairing secret (C_LPS) and a persistent data exchange key pair C_KP. The data exchange key pair C_KP may be used in the future for validation purposes.

In a decision action 614, the network server may verify whether the mobile device corresponding to the pairing request is registered. If the mobile device is not registered, the network server can deny the pairing request as shown in action 638. If the mobile device is registered, the computing device may display a PIN or a QR image corresponding to the computer public key and a secret pairing key (C_LPS) in action 616. The computing device generates the QR image prior to displaying the same. The PIN may be a pre-selected alphanumeric code or it may be randomly generated by the computing device prior to or during the initiation of the pairing request. Alternatively, action 616 may occur prior to the detection of the mobile device registration, where the computing device displays the PIN or QR image directly after it initiates the pairing request. If BLE capability is available, the computing device may use BLE to transmit the C_LPS to the mobile device that can be locally paired with BLE without using a QR scan.

In action 618, the user is prompted in the mobile device to enter the PIN or scan the QR image to acquire the C_LPS. In some embodiments, the network server may initiate a mobile push notification having a transaction identifier, wherein the mobile push notification also includes the computer authentication data. The computer authentication data may be generated prior to the initiation of the pairing request by the computing device. The computer authentication data may be based upon a pairing secret key. Further, in an action 619, the network server may receive computer authentication data.

In a decision action 620, the mobile device application M_PA may make the determination of whether the PIN entered by the mobile device user can validate the request from the computing device. Alternatively, the mobile device may make the determination whether the scanned QR image or BLE received C_LPS can validate the authentication data provided in the pairing request. When a match does not exist in either case, the mobile device may deny the pairing request in action 638. Although it is not shown, the mobile device user may be given more than one chance to enter in the correct PIN or to rescan the QR image or retry BLE transmission of C_LPS. In particular, the process would loop back to action 618. The repetitive attempts to retrieve C_LPS, being a PIN, QR image, or via BLE channel, may be preset to a specific number of attempts, where the pairing request is finally denied and the process ends in action 640. When a match does occur, however, the mobile device may proceed on to extracting the computer public key. In the alternative, (although not shown) the mobile device may request the same information from the network server.

In an action 624, the mobile device may generate a password encryption key and encrypt the password encryption key. In the alternative, the mobile device may retrieve the password encryption key from memory. The encryption of the password encryption key may be implemented using the computer public key sent in the pairing initiation request. The encrypted password encryption key may be transferred to the computing device in action 626. Additionally, the mobile device may generate and transfer mobile authentication data in the same action 626. In particular, the encrypted key may be transferred to the network server, which forwards it to the computing device.

Upon receipt of the encrypted key and the mobile authentication data, the computing device may detect whether the mobile authentication data is valid in decision action 628. When the mobile authentication data is not valid, the computing device may deny the pairing request indirectly through the network server in action 638. On the other hand, when the mobile authentication data is valid, the computing device may decrypt the encrypted key using the computer private key in action 630.

In an action 632, the computing device may encrypt the login password associated with its user account using the password encryption key. This encrypted login password, in action 634, may be stored by the computing device for future use during the password-less login. Further, the password encryption key may be deleted for the purposes of user security in an action 636.

Figure 6B:
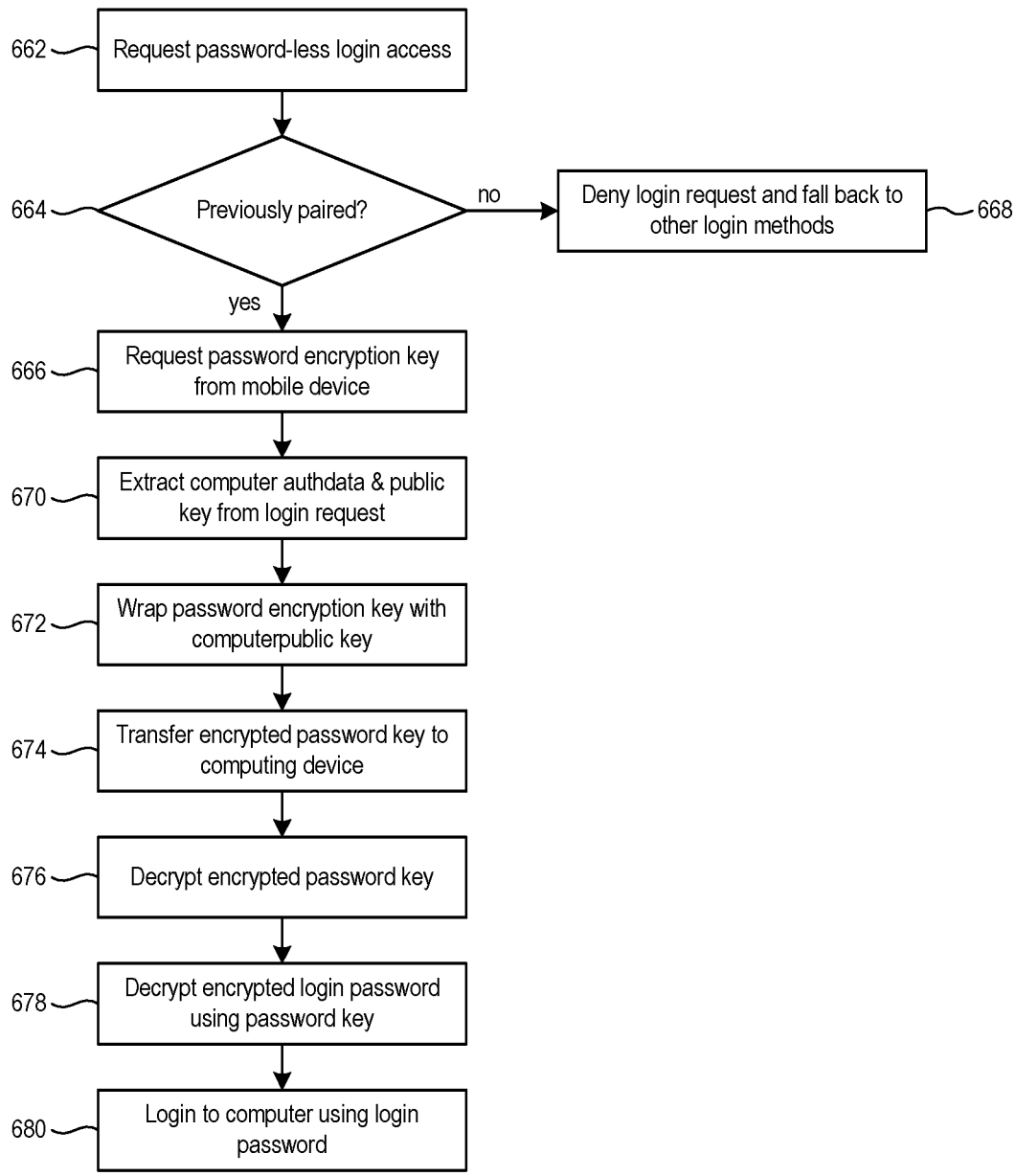
FIG. 6B is a flow diagram of a method 660 for logging into a computer using the password-less login through the network service accordance with some embodiments.

FIG. 6B is a flow diagram of a method 660 for logging into a computer using the password-less login through the network service accordance with some embodiments. In an action 662, a requesting computing device may request a password-less login access to a particular computing device. In particular, the request may be sent to the network server, which in response detects whether the computing device and the mobile device have been paired previously in decision action 664. When a previous pairing does not exist, the password-less login access is denied in action 668. When a previous pairing does exist, the network server asserts a mobile push notification to the mobile device in action 666. The mobile push will alert the mobile device user of the password-less login request. Although not shown, the user may be given the opportunity to deny the login request at this time. In the alternative as shown in an action 670, the mobile device may retrieve the data payload of the password-less login request and extract the computer authentication data and public key from the login request. In the alternative, the network server may extract the computer authentication data and public key and transfer the same to the mobile device.

In an action 672, the mobile device may encrypt the password key using the computer public key. This encrypted password key may be transferred to the computing device in an action 674, wherein the computing device decrypts the encrypted password key using its computer public key in action 676. Further, the computing device may decrypt the encrypted login password previously stored during the pairing phase in action 678. Finally, the computer device may perform a login using the login password in action 680.

Figure 7:
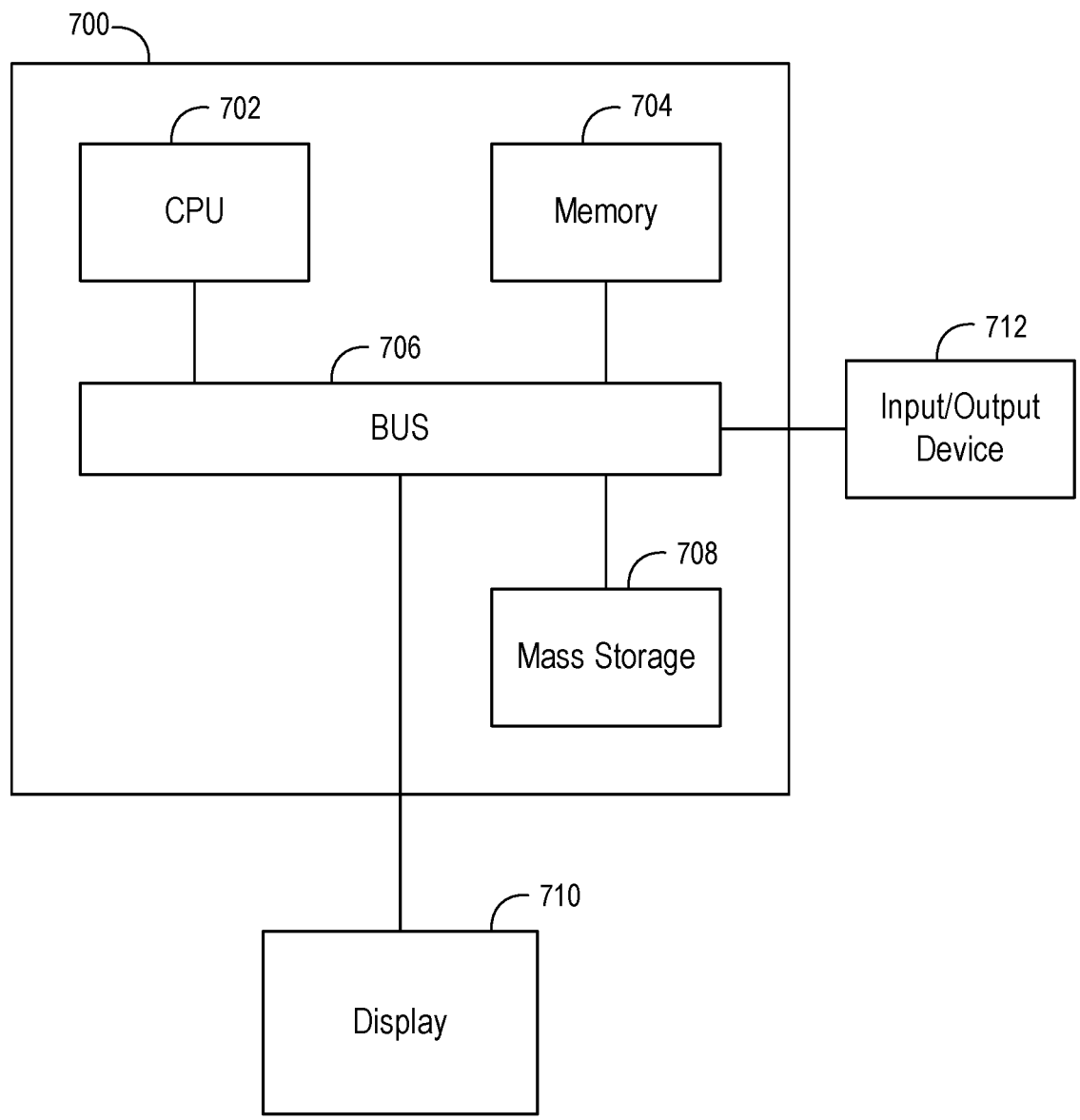
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device 700 of FIG. 7 may be used to perform embodiments of the functionality for performing the method for securely pairing a mobile device with a computer for password-less login using a network service in accordance with some embodiments. The computing device 700 includes a central processing unit (CPU) 702, which is coupled through a bus 706 to a memory 704, and mass storage device 708. Mass storage device 708 represents a persistent data storage device such as a floppy disc drive or a fixed disc drive, which may be local or remote in some embodiments. The mass storage device 708 could implement a backup storage, in some embodiments. Memory 704 may include read only memory, random access memory, etc. Applications resident on the computing device may be stored on or accessed through a computer readable medium such as memory 704 or mass storage device 708 in some embodiments. Applications may also be in the form of modulated electronic signals modulated accessed through a network modem or other network interface of the computing device. It should be appreciated that CPU 702 may be embodied in a general-purpose processor, a special purpose processor, or a specially programmed logic device in some embodiments.

Display 712 is in communication with CPU 702, memory 704, and mass storage device 708, through bus 706. Display 712 is configured to display any visualization tools or reports associated with the system described herein. Input/output device 710 is coupled to bus 706 in order to communicate information in command selections to CPU 702. It should be appreciated that data to and from external devices may be communicated through the input/output device 710. CPU 702 can be defined to execute the functionality described herein to enable the functionality described with reference to FIGS. 1-6B. The code embodying this functionality may be stored within memory 704 or mass storage device 708 for execution by a processor such as CPU 702 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/ components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of data communication in a system comprising:
    sending, from a computer to a mobile device by way of a network server, a pairing request that includes computer authentication data of the computer and a computer public key of the computer, the mobile device, the computer, and the network server being different devices;
    receiving, at the computer from the network server, an indication that the mobile device is registered to pair with the computer;
    pairing, by the computer in response to the pairing request and to the indication, the mobile device with the computer using the network server;
    receiving, at the computer from the mobile device by way of the network server, a mobile public key of the mobile device, mobile authentication data of the mobile device, and an encrypted password encryption key that was encrypted by the mobile device using the computer public key, the network server being unable to decrypt the encrypted password encryption key due to a computer private key being exclusively stored on the computer and not being stored on the network server;
    validating, by the computer, the mobile authentication data using the computer authentication data;
    decrypting, by the computer in response to the validated mobile authentication data, the encrypted password encryption key using the computer private key of the computer; and
    encrypting, by the computer, a login password with the decrypted password encryption key.

2. The method of claim 1, wherein the sending of the pairing request comprises:
    generating, by the computer, a pairing secret key and an exchange key pair of the computer that includes the computer public key and the computer private key;
    generating, by the computer, the computer authentication data from the pairing secret key and the computer private key;
    generating, by the computer, the pairing request including the computer authentication data;
    associating, by the computer, the pairing secret key with a Quick Response (QR) image; and
    transferring, from the computer to the network server, the pairing request.

3. The method of claim 1, wherein the pairing comprises:
    displaying, by the computer, a QR image on a display of the computer;
    initiating, by the computer, in response to the network server detecting whether the mobile device is registered, a mobile push notification having a transaction identifier and including the computer authentication data based upon a pairing secret key;
    the encrypting, by the computer, of the login password with the decrypted password encryption key; and
    storing, by the computer, the encrypted login password, the login password configured for use in a password-less login into the computer.

4. The method of claim 1, wherein the sending of the pairing request comprises:
    generating, by the computer, a pairing secret key and an exchange key pair of the computer that includes the computer public key and the computer private key;
    generating, by the computer, the computer authentication data from the pairing secret key and the computer private key;
    generating, by the computer, the pairing request including the computer authentication data;
    transferring, from the computer, the pairing secret key to the mobile device via Bluetooth when the mobile device is within a proximity of the computer; and
    transferring, from the computer to the network server, the pairing request.

5. The method of claim 1, further comprising:
    transmitting, from the computer to the network server, a login request, including a computer data exchange key identifier and a proof of private key possession associated with the computer public key; and
    receiving, at the computer from the mobile device, an indication that a pairing exists between the computer and the mobile device based upon the mobile device having extracted the computer public key from the proof of private key possession.

6. The method of claim 1, further comprising:
    monitoring, by the computer, each completed device pairing between the computer and the mobile device;
    storing, by the computer, each completed device pairing; and
    authenticating, by the computer, each subsequent pairing service request based upon a plurality of stored completed device pairings.

7. A data communication system comprising:
    a mobile device comprising a processor configured to:
        receive a pairing request from a computer by way of a network server, the pairing request including computer authentication data of the computer and a computer public key of the computer; and encrypt a password encryption key using the computer public key of the computer, and transfer the encrypted password encryption key and mobile authentication data of the computer to the computer via the network server or Bluetooth when the computer is in proximity of the mobile device, the network server being unable to decrypt the encrypted password encryption key due to a computer private key being exclusively stored on the computer and not being stored on the network server.

8. The data communication system of claim 7, wherein the mobile device, in response to a login request from the computer that includes a computer data exchange key identifier and a proof of private key possession associated with the computer public key, receives a mobile push notification; and wherein the processor is further configured to:

extract the computer public key from the proof of private key possession;

detect whether a pairing exists between the computer and the mobile device based upon the computer public key;

encrypt, in response to the detected pairing and user confirmation, the password encryption key using the computer public key; and transmit the encrypted password encryption key from the mobile device to the computer.

9. The data communication system of claim 8, wherein during the pairing the processor is configured to:

receive a mobile push notification with a transaction identifier including computer authentication data of the computer based upon a pairing secret key;

read the computer authentication data;

parse the computer public key of the computer from the computer authentication data;

receive a prompt to scan a QR image displayed on the computer using the mobile device;

scan the QR image;

extract the pairing secret key from the QR image;

validate, in response to the scanned QR image, the pairing request based upon the computer public key and the pairing secret key;

generate, in response to the validated pairing request, the password encryption key; and store the computer public key.

10. A non-transitory computer-readable medium including code for performing a method, the method comprising:

sending, from a computer to a mobile device by way of a network server, a pairing request that includes computer authentication data of the computer and a computer public key of the computer, the mobile device, the computer, and the network server being different devices;

receiving, at the computer from the network server, an indication that the mobile device is registered to pair with the computer;

pairing, by the computer in response to the pairing request and to the indication, the mobile device with the computer using the network server;

receiving, at the computer from the mobile device by way of the network server, a mobile public key of the mobile device, mobile authentication data of the mobile device, and an encrypted password encryption key that was encrypted by the mobile device using the computer public key, the network server being unable to decrypt the encrypted password encryption key due to a computer private key being exclusively stored on the computer and not being stored on the network server;

validating, by the computer, the mobile authentication data using the computer authentication data;

decrypting, by the computer in response to the validated mobile authentication data, the encrypted password encryption key using the computer private key of the computer; and encrypting, by the computer, a login password with the decrypted password encryption key.

11. The non-transitory computer-readable medium of claim 10, wherein the sending of the pairing request comprises:

generating, by the computer, a pairing secret key and an exchange key pair of the computer that includes the computer public key and the computer private key;

generating, by the computer, the computer authentication data from the pairing secret key and the computer private key;

generating, by the computer, the pairing request including the computer authentication data;

associating, by the computer, the pairing secret key with a Quick Response (QR) image; and transferring, from the computer to the network server, the pairing request.

12. The non-transitory computer-readable medium of claim 10, wherein the pairing comprises:

displaying, by the computer, a QR image on a display of the computer;

initiating, by the computer, in response to the network server detecting whether the mobile device is registered, a mobile push notification having a transaction identifier and including the computer authentication data based upon a pairing secret key;

the encrypting, by the computer, of the login password with the decrypted password encryption key; and storing, by the computer, the encrypted login password.

13. The non-transitory computer-readable medium of claim 10, further comprising:

transmitting, from the computer to the network server, a login request, including a computer data exchange key identifier and a proof of private key possession associated with the computer public key; and receiving, at the computer from the mobile device, an indication that a pairing exists between the computer and the mobile device based upon the mobile device having extracted the computer public key from the proof of private key possession.

14. The non-transitory computer-readable medium of claim 10, further comprising:

requesting, by the computer, Enterprise service use entitlement from a delegated entity provider;

receiving, by the computer, Enterprise validation data from the delegated entity provider; and processing, by the computer, the Enterprise validation data to validate the pairing request.

15. The non-transitory computer-readable medium of claim 10, further comprising:

monitoring, by the computer, each completed device pairing between the computer and the mobile device;

storing, by the computer, each completed device pairing; and authenticating, by the computer, each subsequent pairing service request based upon a plurality of stored completed device pairings.

* * * * *